Jan. 26, 1960   G. K. WOODS   2,922,300
MAGNETIC HYDROMETER
Filed Aug. 31, 1954

INVENTOR.
GORDON K. WOODS
BY John O. Graybeal
ATTORNEY

United States Patent Office 2,922,300
Patented Jan. 26, 1960

2,922,300

MAGNETIC HYDROMETER

Gordon K. Woods, Grosse Pointe Farms, Mich.

Application August 31, 1954, Serial No. 453,378

17 Claims. (Cl. 73—32)

The present invention generally relates to apparatus for determining the specific gravity of liquids, and particularly relates to such apparatus of the float type, wherein the active specific gravity sensing elements include a magnetic means.

It is customary in such apparatus of the float type to provide a weighted float means, the depth of float by partial submersion of the float body providing an indication of the specific gravity of a liquid under test. Such conventional specific gravity measuring devices characteristically require float chambers of relatively great volume and as most advantageously used are limited to batch testing of the laboratory type or require, in portable instruments, flexible bulb portions for drawing the liquid to be tested into the float chamber. Certain applications have been made of float type specific gravity measuring apparatus wherein the float portion is provided with a metallic element and the position of submersion is sensed electromagnetically in fixed equipment for process control. However, no device of the type presented is known which contemplates or provides in a portable specific gravity measuring instrument the advantages of magnetic actuation of the float body.

It is an object of the present invention to provide a specific gravity measuring instrument of simplified design.

It is a further object of the present invention to provide a specific gravity measuring instrument utilizing a relatively small volume float chamber.

It is another object of the present invention to provide a specific gravity measuring instrument wherein the float body is provided with a magnetizable core element and is submerged in the liquid under test by attraction of a permanent magnet element.

It is yet another object of the present invention to provide in a specific gravity measuring instrument a float body having a magnetizable core element and an associated adjustably spaced magnetic element, the spacing of the magnetic element and the float body at a point of submergence of the float body in the liquid under test providing an indication of the specific gravity of said liquid.

It is an additional object of the present invention to provide in a specific gravity measuring instrument means for sensing a range of specific gravity, said means comprising a fixed magnetic element and a plurality of float bodies each provided with a magnetizable core element in association with said magnetic element.

These and other objects of the present invention will be apparent from the following description thereof.

According to the present invention, a measure of the specific gravity of a liquid is provided by arranging in the liquid a float body having a magnetizable core element, which float body may, depending on the manner of use of the instrument, be of density slightly greater than or slightly less than the specific gravity of the liquid tested, and arranged with respect to a permanent magnet element so that, at a point of complete submergence of the float body in the liquid under test, the relative spacing between said float body and said magnetic element will provide an indication of the specific gravity of the liquid. To accomplish the necessary submergence of the float body in the liquid under test, the permanent magnet element may be arranged to be adjustably spaced from the float chamber of the instrument, or may be fixed with respect to said float chamber, the instrument in the latter event providing an indication of a specific gravity in excess of or less than a predetermined specific gravity, as the case may be. In a specific application of the latter arrangement of the present invention, a plurality of float chambers are provided in fixed position with respect to a permanent magnet element, with a float body arranged in each of said float chambers, such float bodies being selectively designed to in one instance provide a minimal indication and in the other instance a maximal indication of specific gravity when said float chambers are submerged in the liquid under test.

Figures 1, 2:
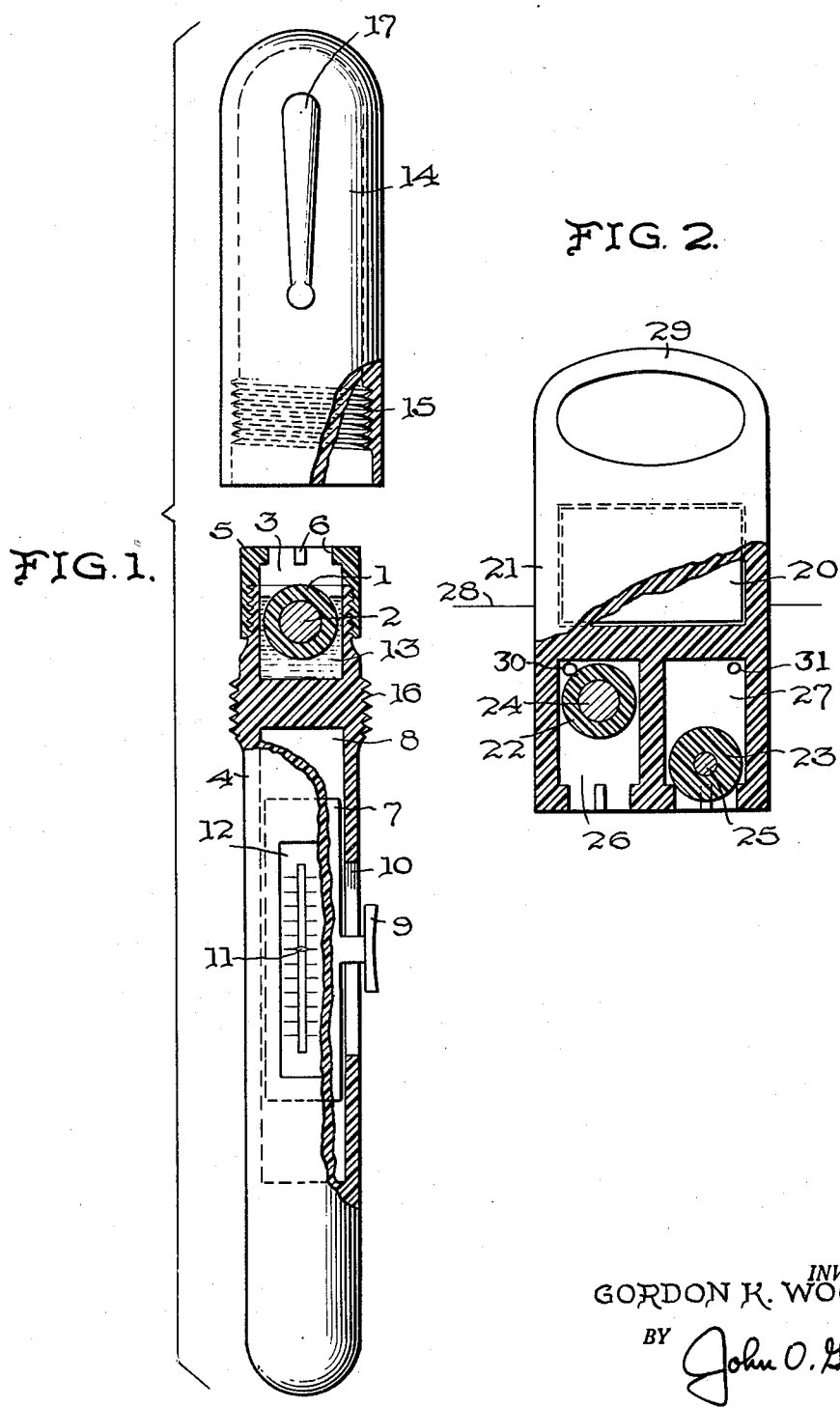
Figure 1 is a longitudinal view illustrating one embodiment of the invention, various portions thereof being shown in cross-section.
Figure 2 is a longitudinal view illustrating a second embodiment of the present invention, various portions being shown in cross-section.

Considering the embodiment of the invention illustrated in Figure 1 in further detail, the active specific gravity measuring elements comprise a float body 1, desirably of plastic or other suitable material of appropriate density having embedded therein an iron core 2, said float body 1 and embedded iron core element 2 being of a net density slightly less than the liquid under test, and arranged in float chamber 3 provided in a housing 4 of suitable transparent material, said housing 4 having in threaded engagement therewith a retaining ring 5 to allow removal of float body 1, as indicated, said retaining ring 5 being further provided with spaced retaining fingers 6. Adjustably mounted with respect to float body 1 is a permanent magnet 7, arranged for sliding adjustment in chamber 8 provided in housing 4, said permanent magnet element 7 having connected thereto a projecting actuator 9, cooperating with a suitable guideway 10 in housing 4, said permanent magnet 7 having further connected thereto a pointer 11 arranged with respect to a scale 12, suitably calibrated to provide an indication of specific gravity. Greatest accuracy in calibration and operation of the type of instrument presented in Figure 1 renders desirable that a preselected point of complete submersion of the float body in the liquid under test be utilized consistently. Thus, one readily detectible point of complete submergence of the float body is encountered where, with the float body in float position, the magnetic attraction is increased by reducing the spacing of the permanent magnet with respect to the float chamber to the point where the float body is first completely submerged. A second readily detectible point which may be utilized for calibration and operation is that point when, with the float body in completely submerged position, the magnetic attraction is decreased until the float body is first released from contact with the float chamber bottom. In use of either such change of position, it is advantageous to consistently employ one such point or the other to increase the accuracy of measurement of the instrument. It may also be found desirable to provide means to standardize the liquid level in the float chamber, as by a level marker or overflow vent, thereby further establishing uniformity of operation.

Operation of the instant specific gravity measuring instrument simply involves placement of the liquid 13 to be tested in chamber 3 and adjustably positioning through means of actuator 9 the permanent magnet 7 to the point of complete submersion of float body 1 in liquid 13, the instrument at such point of adjustment of permanent magnet 7 thereby providing through pointer 11 and scale 12 a direct reading indication of the specific gravity of liquid 13.

For convenience in carrying, it is advantageous to provide the instrument here presented with a float chamber enclosing means such as cap 14, having provided therein a threaded section 15 for thread engagement with a threaded portion 16 provided on body portion 4, said cap device 14 being further provided with a suitable clip 17 so that the instrument in carrying condition resembles and may be carried with the convenience of a fountain pen. Cap 14 may also provide a readily available means for filling chamber 3 with the liquid 13 to be tested, as desired.

A second illustrative embodiment of the present invention, as presented in Figure 2, utilizes a permanent magnet 20 embedded in fixed position in a plastic body portion 21, said permanent magnet 20 being arranged with respect to and operating in connection with two float bodies 22 and 23 as shown, said float bodies 22 and 23, each respectively of density slightly greater than the liquid under test and each having embedded therein an iron core element 24 and 25, the design of permanent magnet 20 and float bodies 22 and 23 being predetermined by a particular range of specific gravity to be maintained by batch testing of a technical process, so that for a given specific gravity of the liquid under test falling within the range of the instrument, one given float element, such as 22 for example, will be attracted to a most proximate position and the other float element 23 will remain in a relatively remote position within respective float chambers 26 and 27 arranged with respect to said permanent magnet 20, generally as shown, the difference in size of iron cores 24 and 25 respectively embedded in float bodies 22 and 23 being somewhat exaggerated in Figure 2 for clarity of illustration. With the indicated arrangement, the operation of the embodiment of the invention illustrated in Figure 2 merely requires immersion of float chambers 26 and 27 beneath the level 28 of the liquid under test, it being understood that suitable apertures 30 and 31 are respectively provided in float chambers 26 and 27 to allow liquid 28 to fill said chambers when the instrument is so immersed. For convenience in handling or connection to a suitable suspension means, not shown, an eye portion 29 may be provided in the instrument body 21.

By virtue of the magnetic actuation of the specific gravity sensing element according to the present disclosure, it will be seen that the float body and float chamber may be materially reduced in dimension from those required in comparable elements of conventional specific gravity measuring instruments. It is a further feature that the float body may be solid in nature, thus enabling construction materially less susceptible to breakage. The above and other improvements and advantages in constructional design hereby provided render practical a specific gravity measuring instrument of small overall dimension and of rugged construction which requires only a relatively small sample of the liquid to be tested. These features present in such an instrument an effective tool of varied application in field work, such as for urinalysis and similar tests in the medical and other professional fields, and such as for spot testing in chemical process control.

From the foregoing disclosure of two typical embodiments of the present invention, various other modifications thereof will occur to those skilled in the art. Thus, it will be readily apparent that in the embodiment of the invention illustrated in Figure 1, the means for providing relative adjustment between the float chamber and the permanent magnet element may take other forms, such as a longitudinal threaded shaft and end-arranged, rotative actuator, in the general manner of micrometer adjustment elements. Further, it will be considered that while the float bodies in the embodiments of the invention are specifically disclosed as solid in nature and comprised of plastic material having embedded therein a magnetizable core element, said float bodies may alternatively comprise an enclosed gaseous portion consistent with the appropriate net density of the float body for a particular instrument design. Considering further variations of the arrangement of the present invention illustrated in Figure 2, it will be readily understood that an additional float chamber and float body of appropriate design may be utilized to indicate a particular specific gravity within a range of specific gravities indicated by two other float bodies, or may provide a second maximal or minimal range indication in cooperation with another float body. Additionally, it is to be considered that in an instrument according to the present invention utilizing plural float chambers, the float chambers may be of respectively different spacing from the permanent magnet element to provide the desired specific gravity sensing range or may operate in association with plural magnetic elements of different magnetic strengths to accomplish this purpose.

It will also be readily understood that while the embodiments of the invention specifically disclosed comprise a magnetizable element in a float body and a magnetic element in spaced relation with respect thereto, certain instrumentation may adopt arrangement of the magnetic element in the float body and the magnetizable element, such as a ferritic core as the influencing element. Other variations and modifications of the invention within the scope of the following claims will also be apparent.

What is claimed is:

1. A specific gravity detecting instrument, comprising a float chamber, a float body in said float chamber, a magnetizable element in said float body, a permanent magnet element movably mounted in magnetically effective relation with respect to said float body, means permitting adjustment of said permanent magnet element independently of and in alignment with the direction of movement of said float body to move said float body from a floating to a submerged position in liquid contained in said float chamber, and means measuring the relative position of said permanent magnet element with respect to said float chamber.

2. An instrument for detecting the specific gravity of a liquid, comprising a housing providing a float chamber, a magnetically responsive float body in said float chamber, said housing further having a permanently magnetized element in spaced, magnetically effective relation with and mounted for relative movement substantially directly toward and away from said float body, the range and direction of adjustment of said permanently magnetized element causing said float body to selectively move to and from a submerged position in liquid contained in said float chamber, and means responsive to movement of said permanently magnetized element, from which a measure of the specific gravity of the liquid in said float chamber can be obtained.

3. An instrument according to claim 2, wherein the line of movement of said permanently magnetized element is in the line of movement of said float body to and from a submerged position.

4. An instrument according to claim 2, wherein said float chamber is open-ended and provided thereat with a removable ring having inwardly directed means dimensioned to physically retain said float body in said float chamber.

5. A specific gravity measuring instrument comprising a float chamber, a float body in said float chamber, a magnetizable element in said float body, the net density of said float body being slightly less than the specific gravity of the liquid to be tested, permanent magnet means in magnetically effective spaced relation with respect to said float chamber and of a character to attract said float body, means permitting movement of said permanent magnet means toward said float body to cause complete submergence of said float body in the liquid under test, and means indicating the relative position of said permanent magnet means with respect to said float chamber on occurrence of such submergence, such indication providing a measure of the specific gravity of the said liquid.

6. An instrument according to claim 5, further comprising cap means removably encompassing said float chamber.

7. An instrument according to claim 5, further comprising scale and pointer indicating means responsive to movement of said permanent magnet means and calibrated to provide a direct reading of the specific gravity of the liquid under test at a point of complete submergence of the float body in said liquid.

8. An instrument according to claim 5, wherein said permanent magnet means is surrounded by a housing and provided with an actuator arranged externally of said housing to facilitate adjustment thereof.

9. A specific gravity instrument, comprising a float chamber, a float body in said float chamber, a magnetizable element in said float body, the net density of said float body being slightly less than the specific gravity of a liquid to be tested, permanent magnet means in magnetically effective spaced relation with respect to said float chamber and of a character to attract said float body, means permitting movement of said permanent magnet means away from said float body to cause floating thereof in the liquid under test, and means indicating the relative position of said permanent magnet means with respect to said fixed chamber on occurrence of such floating, such indication providing a measure of the specific gravity of the said liquid.

10. An instrument according to claim 9, further comprising cap means removably encompassing said float chamber.

11. An instrument according to claim 9, wherein such indicating means comprises a scale and pointer, the latter responsive to movement of said permanent magnet means, said scale being calibrated to provide a direct reading of the specific gravity of the liquid under test at the point of movement of said float body from a submerged position.

12. An instrument according to claim 9, wherein said permanent magnet means is surrounded by a housing provided with an actuator arranged externally of said housing to facilitate adjustment thereof.

13. A specific gravity measuring instrument comprising a float chamber arranged to contain a sample of the liquid under test, a float body in said float chamber, a ferritic element in said float body, said instrument further comprising a second ferritic element mounted in spaced, magnetically effective relation with respect to said float body, at least one of said ferritic elements being permanently magnetized, means permitting selective variation of the spaced relation between said ferritic elements in a direction aligned with the direction of movement of said float body when moving from submerged to floating position in the said liquid in said float chamber, and means indicating the relative position of said second ferritic element with respect to said float chamber and providing a measure of the specific gravity of said liquid.

14. A specific gravity measuring instrument comprising a float body comprising a ferritic element, a float chamber arranged to contain a sample of the liquid under test and dimensioned to present only sufficient liquid to said float body to permit complete submergence thereof, a second ferritic element spaced from said float body and movable toward or away therefrom in the direction of movement of said float body when moving from submerged to floating position in the said liquid in said float chamber at least one of said ferritic elements being permanently magnetized, and a specific gravity indicator means including a fixed scale and a pointer, the latter being movable with said second ferritic element.

15. A portable specific gravity measuring instrument presenting the general external appearance of a fountain pen, comprising a float chamber to contain the liquid under test, a float body in said float chamber, a ferritic element in said float body, a second ferritic element arranged in spaced relation with respect to said float chamber and reciprocably movable with respect thereto in a direction substantially perpendicular to the surface of the liquid under test, at least one of said ferritic elements being permanently magnetized, and means responsive to movement of said second ferritic element and giving a direct visual indication of the specific gravity of said liquid under test.

16. An instrument according to claim 15, further comprising removable cap means encompassing said float chamber to protect the latter from becoming contaminated when not in use and to provide a readily available means for filling said chamber with the said liquid under test.

17. An instrument according to claim 15, wherein said second ferritic element mounts a pointer means cooperatively related to an indicator scale means in a manner presenting a direct reading of the specific gravity of the liquid under test by indication of the relative spaced relation of said float body and said second ferritic element at a point of complete submergence of said float body in the liquid under test.

References Cited in the file of this patent

UNITED STATES PATENTS

| 1,790,948 | Rodgers | Feb. 3, 1931 |
| 2,053,353 | Talbot | Sept. 8, 1936 |
| 2,386,643 | Wallace | Oct. 9, 1945 |
| 2,598,835 | Ryan | June 3, 1952 |
| 2,691,296 | De Giers | Oct. 12, 1954 |

OTHER REFERENCES

Journal of The American Chemical Society, 1913, vol. 35, pp. 1666–1693.

The Review of Scientific Instruments, vol. 22, No. 8, August 1955, pages 642–646.